(12) United States Patent
Ruelle et al.

(10) Patent No.: US 8,876,347 B2
(45) Date of Patent: Nov. 4, 2014

(54) DEVICE FOR CONTROLLING LIGHT FROM AN LED

(75) Inventors: Michel O. Ruelle, Cecil, WI (US); Gary L. Boie, Pulaski, WI (US)

(73) Assignee: BR Methods, Inc., Pulaski, WI (US)

( * ) Notice: Subject to any disclaimer, the term of this patent is extended or adjusted under 35 U.S.C. 154(b) by 781 days.

(21) Appl. No.: 12/930,382

(22) Filed: Jan. 5, 2011

(65) Prior Publication Data

US 2011/0163670 A1    Jul. 7, 2011

Related U.S. Application Data

(60) Provisional application No. 61/292,802, filed on Jan. 6, 2010.

(51) Int. Cl.
| | |
|---|---|
| *F21V 9/08* | (2006.01) |
| *B60Q 1/26* | (2006.01) |
| *B60Q 1/52* | (2006.01) |

(52) U.S. Cl.
CPC ............... *B60Q 1/2611* (2013.01); *B60Q 1/52* (2013.01); *B60Q 1/2696* (2013.01)
USPC ......................................... 362/560; 362/559

(58) Field of Classification Search
USPC ............ 362/560, 561, 559, 245, 246, 249.01, 362/249.11, 296.1, 311.01, 311.03
See application file for complete search history.

(56) References Cited

U.S. PATENT DOCUMENTS

| | | | | |
|---|---|---|---|---|
| 7,229,199 | B2 * | 6/2007 | Lee et al. ...................... | 362/561 |
| 7,404,655 | B2 * | 7/2008 | Walser et al. .................. | 362/494 |
| 2005/0206772 | A1 * | 9/2005 | Yang .............................. | 348/335 |
| 2007/0014125 | A1 * | 1/2007 | Chu ............................... | 362/565 |
| 2008/0136661 | A1 * | 6/2008 | Pederson et al. ......... | 340/815.45 |
| 2008/0170392 | A1 * | 7/2008 | Speier et al. .................. | 362/227 |

\* cited by examiner

*Primary Examiner* — Minh D A
(74) *Attorney, Agent, or Firm* — Philip M. Weiss; Weiss & Weiss (57) ABSTRACT

A device for controlling LED light beam direction and brightness.

17 Claims, 9 Drawing Sheets

DEVICE FOR CONTROLLING LIGHT FROM AN LED

RELATED APPLICATIONS

The present application claims priority to provisional patent application Ser. No. 61/292,802, filed Jan. 6, 2010.

FIELD OF THE INVENTION

The present invention relates to a device for controlling LED light beam direction and brightness.

BACKGROUND OF THE INVENTION

U.S. Pat. No. 7,490,951 relates to an LED lamp having LEDs aimed rearward with either a concave mirror to the rear of each LED, or one concave mirror to the rear of two or more LEDs, collecting the light from the LEDs to form a forward projecting beam.

U.S. Pat. No. 6,930,737 relates to a liquid crystal (LCD) device having non-white and white light emitting diodes and a liquid crystal display. A light extracting surface may be located near the first surface of the light pipe, a diffuser located near a second side of the light pipe, where the first and second sides are opposite sides of the light pipe, a reflective polarizer and a liquid crystal display. The light from the light pipes passes through the diffuser and the reflective polarizer, before backlighting the liquid crystal display. The non-white LEDs may include blue LED, ultraviolet LEDs, and the like.

U.S. Pat. No. 6,851,834 discloses a light fixture consisting of one or more light emitting diode (LED) systems within a housing. Each LED system includes one or more LED light sources that simultaneously shines onto opposing reflecting surfaces, then shines forward through encapsulation material. The housing consists of a cluster of sockets with an outer reflective surface. The housing has diffusers that adjust the light to an evenly distributed appearance.

U.S. Pat. No. 6,666,565 is for a LED flashlight that utilizes reflection techniques to maximize light provided by one or more LED light sources. A reflection housing is connected to the flashlight housing and includes a light housing that is suspended within the reflection housing and positions the LED light source toward the flashlight handle. Reflective surfaces within the reflection housing receive the light emanating from the LED light source and reflect and re-direct the light out the transparent end opposite the flashlight handle. In one embodiment, the light emitting comprises a diffuser, and in another embodiment a magnifier.

U.S. Pat. No. 6,595,671 refers to a plurality of light emitting diodes configured to provide light and a reflective surface with holographic characteristics configured to disperse, diffuse, and reflect light emitting from the light emitting diodes.

U.S. Pat. No. 6,490,104 relates to a compact illumination system suitable for illuminating a micro display and places the light source within the view of the display. In one embodiment, the illumination system comprises a light source, a package for the light source having a reflective surface on at least one side of the light source, and a diffuser opposite the reflective surface in direct view of the light source.

U.S. Pat. No. 6,019,493 relates to a hemispherical inner lens which comprise a center convex lens portion which amplifies light from center area of the LEDs and diffuses it in different directions.

U.S. Pat. No. 5,272,514 relates to a day/night weapon sight comprising a red dot aiming portion having a light emitting diode, a combining mirror, and an apparatus for mounting the LED and the mirror on a weapon to produce a virtual image of the LED at an infinite distance in alignment with the bore sight of the weapon.

US patent publications 2005/0007304 and 2006/0132064 relate to a burst pulse circuit for signal lights. A circuit is provided for over-driving a super luminescent LED having a maximum forward continuous current rating. A power supply provides a pulse width modulated signal to an analog memory connected to the power supply and a pulse generator. A power driver that is controlled by the output of the pulse generator, is operably connected with the super luminescent light emitting diode and with the power supply so as to energize the super luminescent LED with a current that is above the maximum forward continuous current rating by between two and ten times that rated current.

US patent publication 2006/0076908 relates to a lighting zone control method and apparatus. Lighting networks that include multiple LED based lighting units, and user interfaces to facilitate control of such networks. Lighting units of a lighting network may be configured to generate one or more of variable color light, variable intensity lights, and variable color temperature white light.

US patent publications 2002/0105432, 2005/0231381, 20060238368, and 2008/0136661 relate to a LED warning light and communication system. An LED warning signal light and communication device comprises a controller for generating a first observable light signal and a second non-observable light signal within the first light signal. The second light signal is formed of packets of individual pulsed light which may be processed for comparison to data stored in memory integral to a controller for communication of information to an individual through the use of pulsed light signals.

US patent publication 2008/0300661 relates to a perceptible apparatus and methods for use and calibration in helping to create a reactive effect upon a user. It includes a control circuitry operative to generate one of a plurality of selected signals. Included is a structure for producing a variable perceptible output in response to one of a plurality of the selected signals and a translucent element adjacent to the structure for producing a variable perceptible output, the translucent element is operative diffuse and emit the variable perceptible output.

US patent publication 2009/0103053 relates to a projection apparatus comprising spatial light modulator. The invention comprises a light source, a plurality of spatial light modulators each comprising a micromirror for deflecting and reflecting an incident light emitted from the light source.

US patent publication 2002/0093820 relates to a LED reflector. The Led lamp is generally formed of a heat sink housing holding an array of LED illumination elements. A culminator/reflector is preferably positioned over the LED illumination sources to reflect the majority of the emitted light along a desired line of sight. A lens or cover interfaces with the heat sink housing.

US patent publication 2008/0310850 relates to an LED light communication system. An LED light and communication system includes at least one optical transceiver, including a light support and processor. The light support has a plurality of LEDs and at least one photodetector attached, the LEDs receiving power from a power source.

SUMMARY OF THE INVENTION

The present invention relates to a device for controlling LED light beam direction and brightness. It is an object of the present invention to provide a device which directs an LED light beam and reduces brightness of light emitted from an LED system installed on vehicles for signaling warnings or emergencies such as a police car, a fire truck, a snow plow and an ambulance.

LEDs are used in a variety of applications such as TVs, radios, telephones, calculators, watches, and laboratory and electronics test equipment. In many of these applications, LED brightness is excessive and needs to be attenuated.

The present invention provides for three steps to control and direct light emitted from LEDs: 1) directing the light onto a substantially reflective surface; 2) redirecting and spreading the light reflected off this surface; and 3) diffusing the light. This configuration is adaptable to a vehicle wherein a set of LEDs is disposed on the roof of the vehicle with the LEDs arranged to direct the lights upward. The light bounces off a reflective surface that redirects the lights to the sides of the vehicle in a direction about 90 degrees relative to the source. The redirected light passes through a diffuser that reduces the brightness to a desired intensity level.

It is an object of the present invention for the device to enable cycling the lights in a 360 degree circle. It is an object of the present invention for the LED lighting to alternate in a predetermined sequence with each LED programmed to light up for a predetermined time period then being turned off. This produces an effect similar to the flashing lights such as seen in police car or ambulances, but does not require expensive mechanical moving parts commonly used at present to produce this effect. It is an object of the present invention for all LEDs to turn on and off at predetermined time intervals.

It is an object of the present invention for the device to comprise an LED structure having a plurality of LEDs disposed on the surface of the LED structure. It is an object of the present invention for the structure to be powered by batteries placed inside the structure or using other voltage sources which may be either AC or DC sources.

It is an object of the present invention for controls for alternating the sequence of the LEDs turning on and off to be housed inside the structure. It is an object of the present invention for the LEDs to be covered by a substantially transparent lens. It is an object of the present invention for the lens to protect the LEDs and collimate the light emitted by the LED onto a reflective surface in a manner that the path of the light deviates only about +/−10 degrees from vertical in relation to the LED.

It is an object of the present invention for the lens to be colored if it is desired to provide the effect of a flashing colored light. It is an object of the present invention for the colors to be red, green and blue, but other colors also fall within the scope of the present invention.

It is an object of the present invention for a light beam to be emitted from the LED structure vertically and upward in relation to the LED structure disposed in a horizontal position. It is an object of the present invention for the reflective surface to be formed in the shape of a cone that is encased in a housing.

It is an object of the present invention for the reflective surface to redirect the light at an angle of about 90 degrees in relation to the beam leaving the LED. The reflected light comes off the reflective surface substantially horizontally, and is then transmitted through the diffuser. It is an object of the present invention for the lens to have only a minimal attenuating effect on the beam of light.

It is an object of the present invention for the reflective surface to be angled at about 45 degrees; however, the angle may range from about 35 degrees to about 55 degrees depending on the application.

It is an object of the present invention to control the brightness of the beam of light exiting the device by varying the properties of the reflective cone surface and diffuser. It is an object of the present invention for the reflectance efficiency of the cone surface to be in the range from about 85% to about 99%, and more typically from 95% and 97%.

It is an object of the present invention for the transmission efficiency through the diffuser to be in the range from about 50% to about 70%, and more typically from about 55% to about 60%. It is an object of the present invention for the reflective cone surface and the diffuser to comprise but not limited to metal, plastic and glass.

It is an object of the present invention for the reflective cone to be made of a thermoplastic material, polished to an A-2 mold finish with a chrome-plated finish. It is an object of the present invention for the diffuser to be made of a thermoplastic material having a series of transparent prismatic surfaces and/or a slight translucency to diffuse the light.

The present invention relates to a device comprising an LED structure having a plurality of LEDs disposed around the perimeter of the LED structure surface. It is an object of the present invention for the structure to be powered by batteries placed inside the structure or using other voltage sources which may be either AC or DC sources. It is an object of the present invention for controls for alternating the sequence of the LEDs turning on and off to be housed inside the structure.

It is an object of the present invention for each LED to be placed in its own housing having side walls. It is an object of the present invention for the inner surfaces of the side walls to be covered with a reflective material that concentrates the light emanating from the LED and directs it substantially upward.

It is an object of the present invention for the reflectance efficiency of the LED housing side walls to range from about 85% to about 99%, and more typically from 95% and 97%.

It is an object of the present invention for the light emanating from the LEDs are directed onto a reflective surface enclosed in a housing. It is an object of the present invention for the reflective surface to be angled inward and positioned directly above the LEDs in a manner that most of the light from the LEDs bounces off the reflective surface and is redirected at about 90 degrees relative to the originating light.

It is an object of the present invention for the reflectance efficiency of the reflective surface to range from about 85% to about 99%, and more typically from 95% and 97%.

It is an object of the present invention for the LEDs to be covered by a substantially transparent lens. It is an object of the present invention for the lens to protect the LEDs and collimate the light emitted by the LED onto the reflective surface in a manner that the path of the light deviates only about +/−10 degrees from vertical in relation to the LED.

It is an object of the present invention for the lens to be colored to provide the effect of a flashing colored light. It is an object of the present invention for the colors to be red, green and blue, but other colors also fall within the scope of the present invention.

It is an object of the present invention for the light beam to be emitted from the LEDs vertically and upward in relation to the LED structure disposed in a horizontal position. It is an object of the present invention for the reflected light to come off the reflective surface substantially horizontally, and is then transmitted through the diffuser. It is an object of the present invention for the transparent lens to have only a minimal attenuating effect on the beam of light. It is an object of the present invention for the reflective surface to be angled inward at about 45 degrees; however, the angle may range from about 35 degrees to about 55 degrees depending on the application.

It is an object of the present invention for the transmission efficiency through the diffuser to range from about 50% to about 70%, and more typically from about 55% to about 60%. It is an object of the present invention for materials for the construction of the reflective cone surface and the diffuser to include but not limited to metal, plastic and glass.

It is an object of the present invention for the reflective cone to be made of a thermoplastic material, polished to an A-2 mold finish with a chrome-plated finish. It is an object of the present invention for the diffuser to be made of a thermoplastic material having a series of transparent prismatic surfaces and/or a slight translucency to diffuse the light.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention.

The present invention relates to a device for controlling LED light beam direction and brightness. Embodiments of the present invention may relate to a device for directing an LED light beam and reducing brightness of light emitted from an LED system installed on vehicles for signaling warnings or emergencies such as a police car, a fire truck, a snow plow and an ambulance.

LEDs are used in a variety of applications such as TVs, radios, telephones, calculators, watches, and laboratory and electronics test equipment. In many of these applications, LED brightness is excessive and needs to be attenuated.

The present invention provides for three steps to control and direct light emitted from LEDs: 1) directing the light onto a substantially reflective surface; 2) redirecting and spreading the light reflected off this surface; and 3) diffusing the light. This configuration is adaptable to a vehicle wherein a set of LEDs would be disposed on the roof of the vehicle with the LEDs arranged to direct the lights upward. The light bounces off a reflective surface that redirects the lights to the sides of the vehicle in a direction about 90 degrees relative to the source. The redirected light passes through a diffuser that reduces the brightness to a desired intensity level.

An important aspect of this design is that it enables cycling the lights in a 360 degree circle. LED lighting may be configured to alternate in a predetermined sequence with each LED programmed to light up for a predetermined time period then being turned off. This produces an effect similar to the flashing lights such as seen in police car or ambulances, but does not require expensive mechanical moving parts commonly used at present to produce this effect. Alternatively, all LEDs may turn on and off at predetermined time intervals.

In an exemplary embodiment of the present invention, FIGS. 1-4 show the device 10 comprising an LED structure 17 having a plurality of LEDs 19 disposed on the surface of the LED structure 17. The structure may be powered by batteries placed inside the structure 17 or using other voltage sources which may be either AC or DC sources. Controls for alternating the sequence of the LEDs 19 turning on and off would also be housed inside the structure 17. The LEDs are covered by a substantially transparent lens 12. The lens 12 protects the LEDs and collimates the light emitted by the LED onto the reflective surface 11 in a manner that the path of the light deviates only about +/−10 degrees from vertical in relation to the LED. The lens may be colored if it is desired to provide the effect of a flashing colored light. Typical colors are red, green and blue, but other colors also fall within the scope of the present invention.

Figure 1:
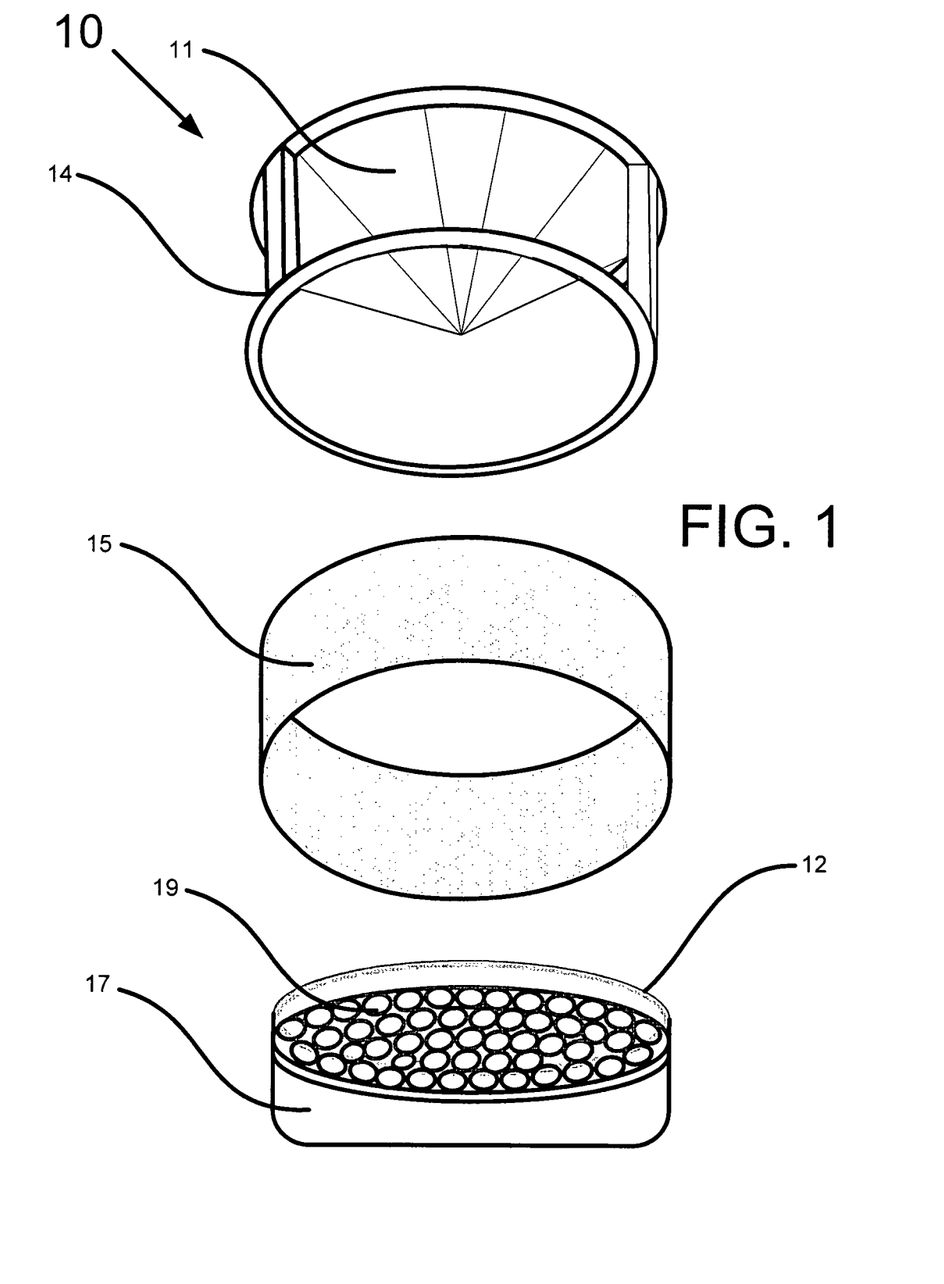
FIG. 1 is an exploded perspective view of the device according to an embodiment of the present invention.
Figure 2:
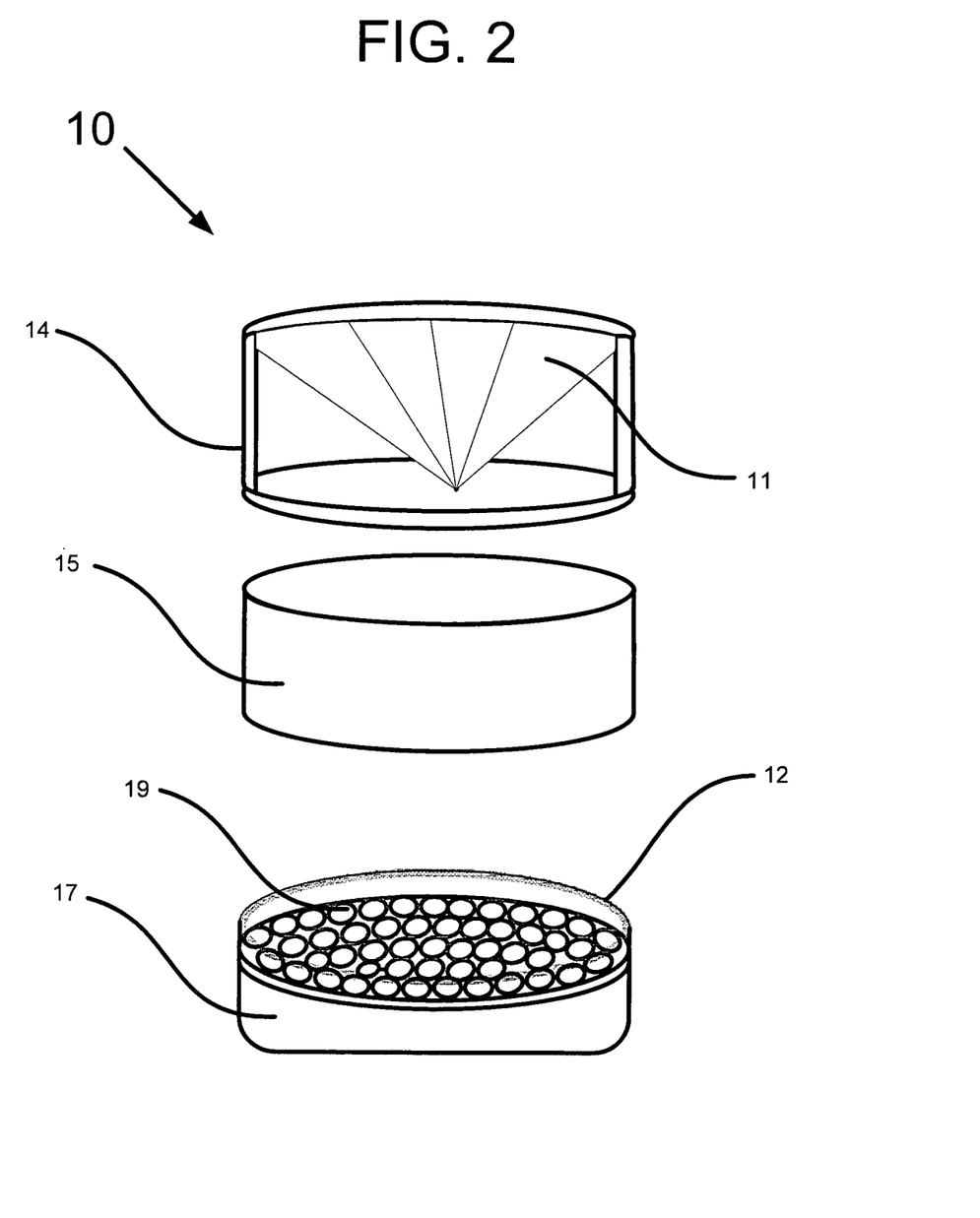
FIG. 2 is a frontal exploded view of the device according to an embodiment of the present invention.
Figure 3:
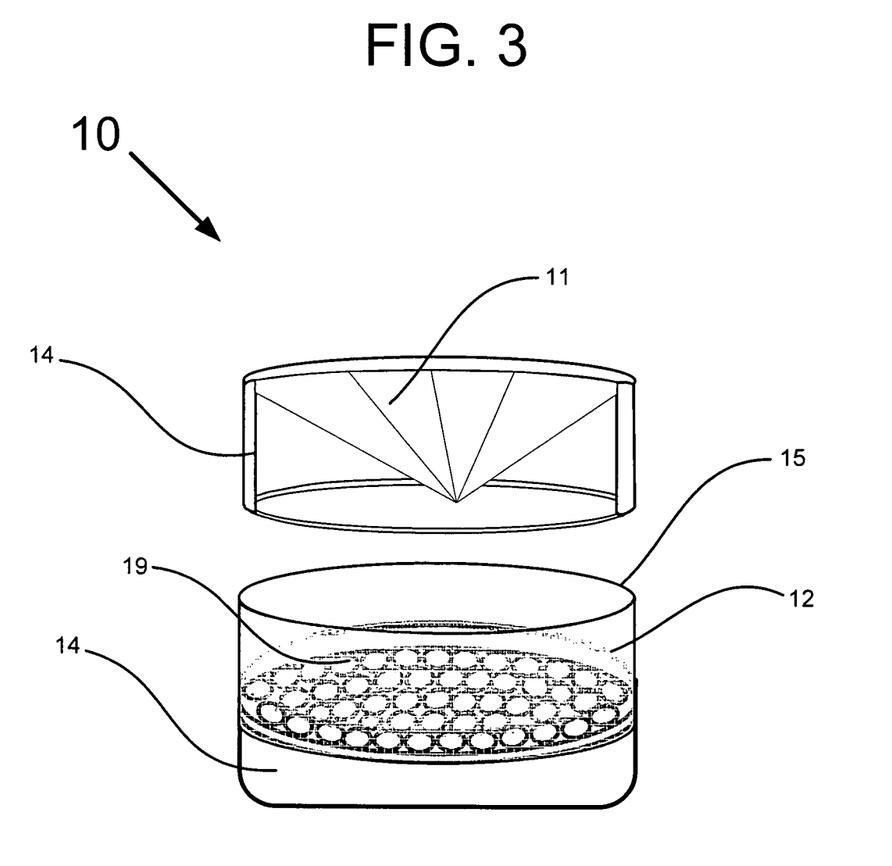
FIG. 3 is a frontal exploded view of the partially assembled device according to an embodiment of the present invention.
Figure 4:
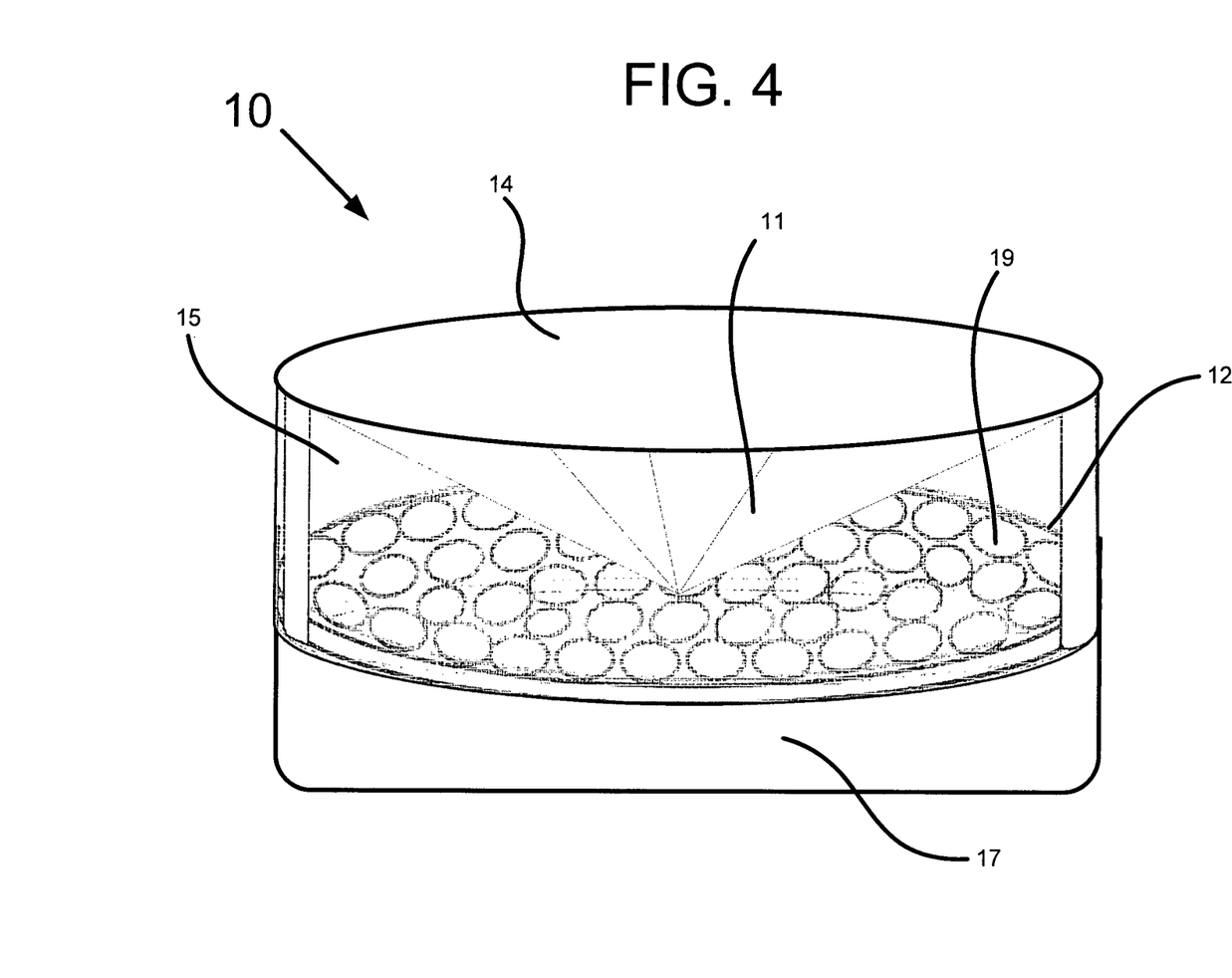
FIG. 4 is a frontal perspective view of the assembled device according to an embodiment of the present invention.
Figure 5:
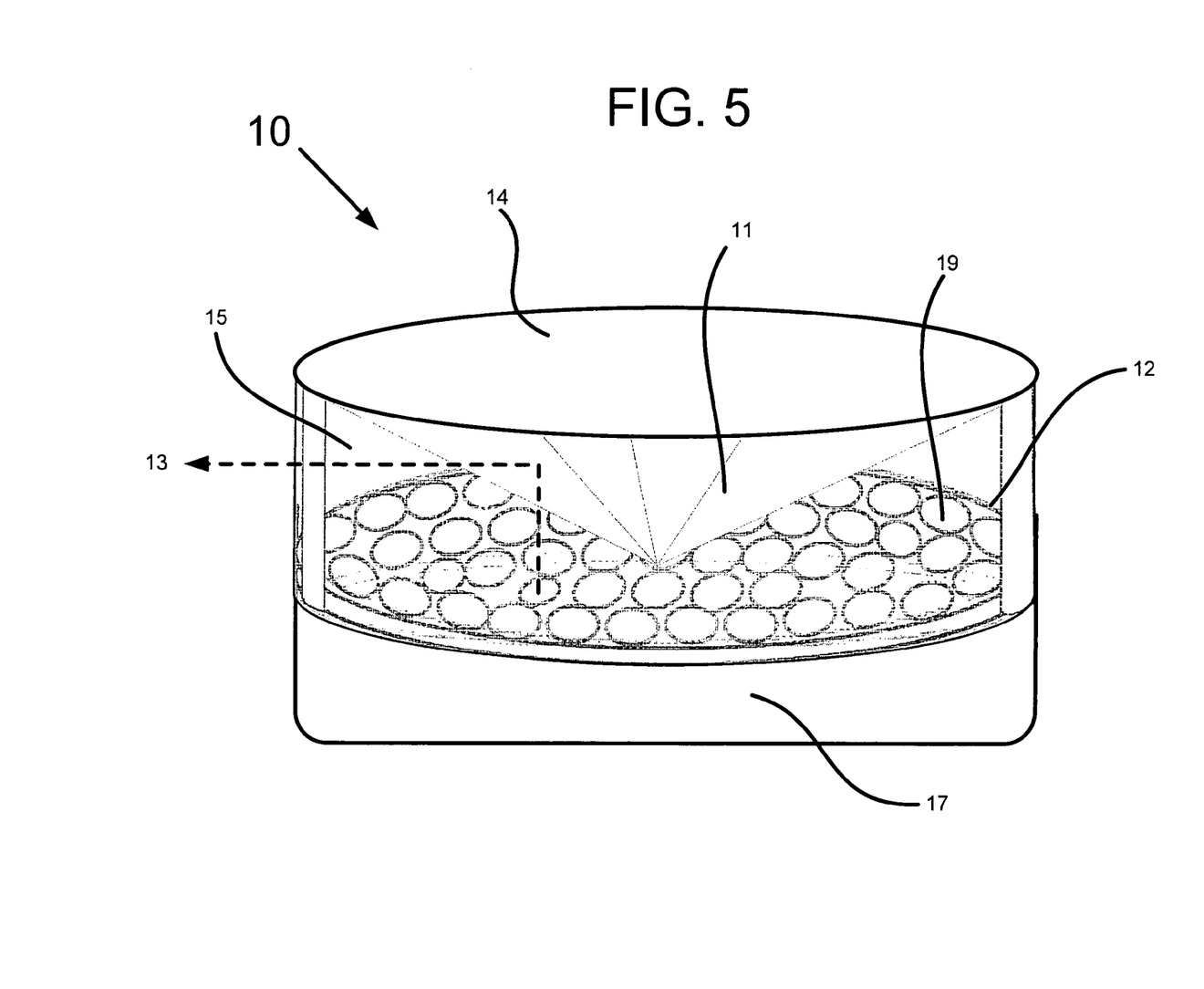
FIG. 5 is a frontal perspective view of the assembled device according to an embodiment of the present invention showing the path of light emitted from the device.
Figure 6:
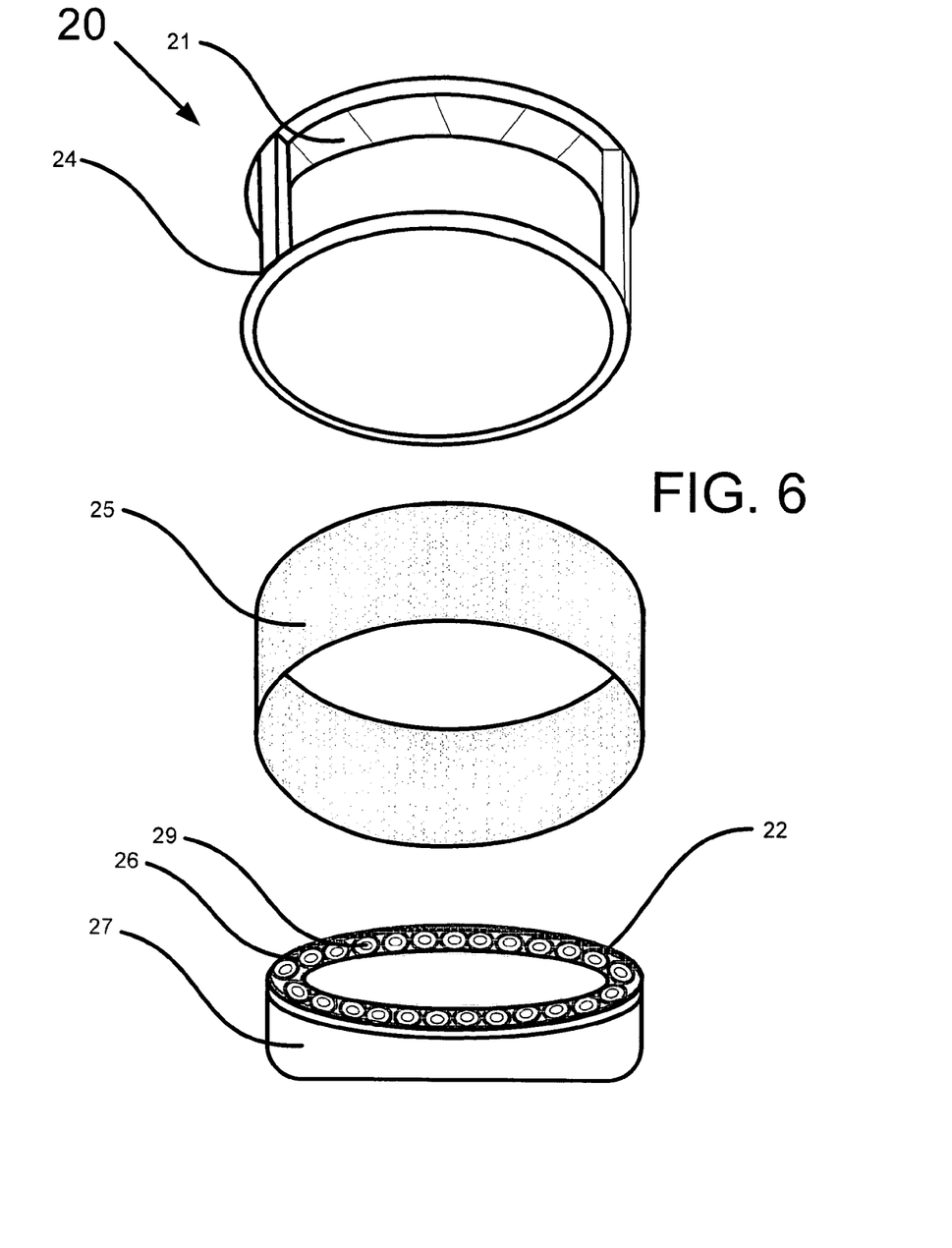
FIG. 6 is an exploded perspective view of the device according to an embodiment of the present invention.
Figure 7:
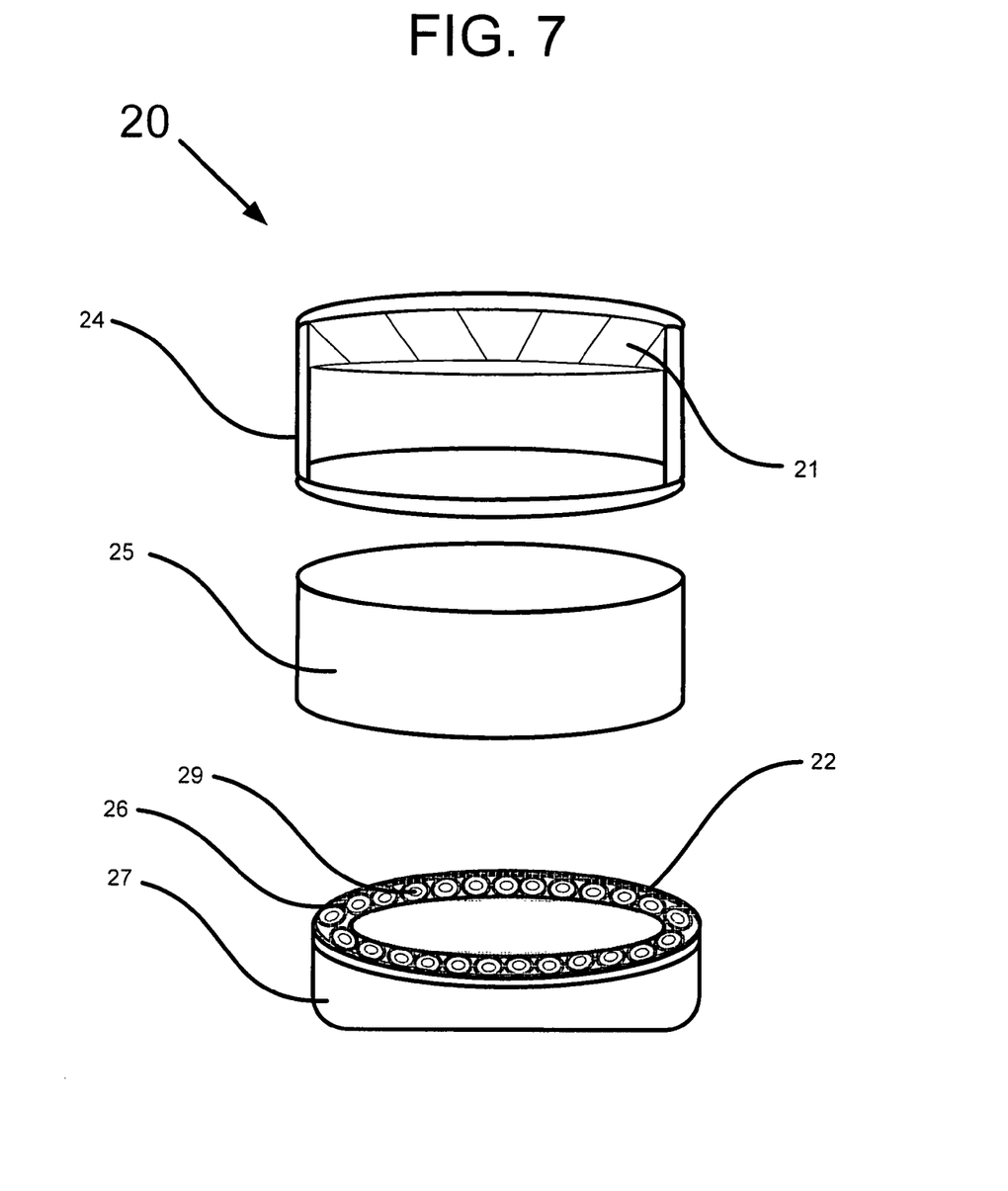
FIG. 7 is a frontal exploded view of the device according to an embodiment of the present invention.
Figure 8:
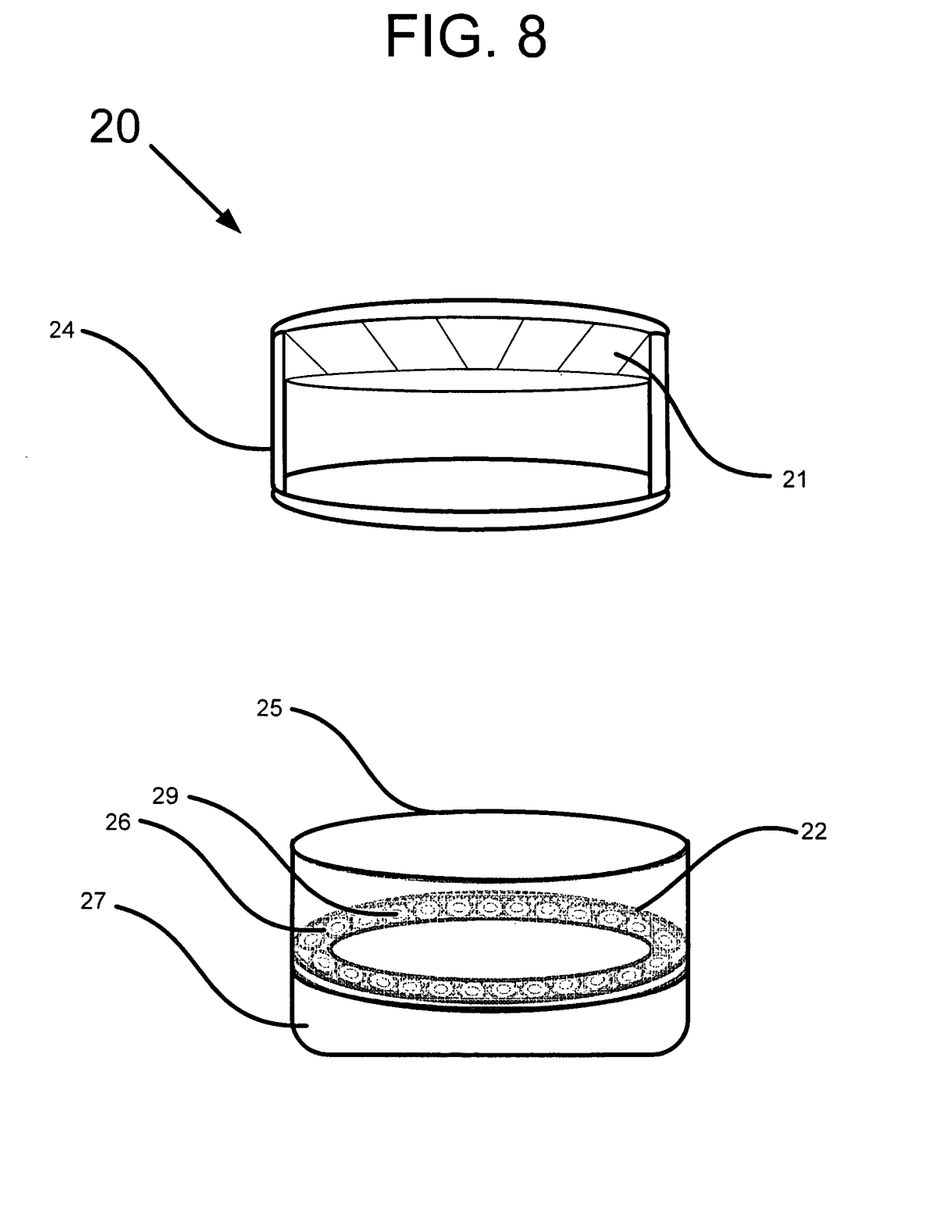
FIG. 8 is a frontal exploded view of the partially assembled device according to an embodiment of the present invention.
Figure 9:
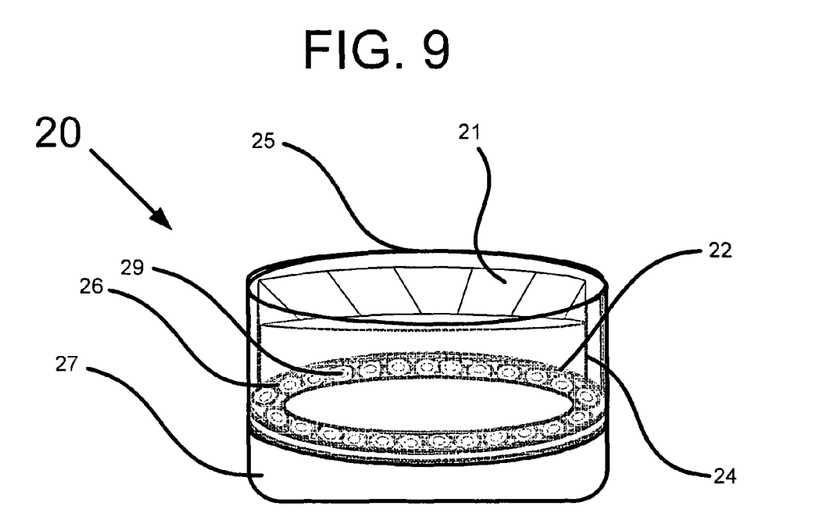
FIG. 9 is a frontal perspective view of the assembled device according to an embodiment of the present invention.

A path for the beam of light 13 originating from an LED is shown in FIG. 5. The light beam 13 is emitted from the LED structure 17 vertically and upward in relation to the LED structure disposed in a horizontal position. The reflective surface 11 is formed in the shape of a cone that is encased in a housing 14. The reflective surface 11 redirects the light at an angle of about 90 degrees in relation to the beam leaving the LED. The reflected light comes off the reflective surface 11 substantially horizontally, and is then transmitted through the diffuser 15. The lens is designed to have only a minimal attenuating effect on the beam of light 13. Most typically, the reflective surface is angled at about 45 degrees; however, the angle may range from about 35 degrees to about 55 degrees depending on the application.

Controlling the brightness of the beam of light 13 exiting the device may be accomplished by varying the properties of the reflective cone surface 11 and diffuser 15. Depending on the application, the reflectance efficiency of the cone surface may range from about 85% to about 99%, and more typically from 95% and 97%. The transmission efficiency through the diffuser 15 may range from about 50% to about 70%, and more typically from about 55% to about 60%. Suitable materials for the construction of the reflective cone surface and the diffuser include but are not limited to metal, plastic and glass. In an exemplary embodiment of the present invention, the reflective cone is made of a thermoplastic material, polished to an A-2 mold finish with a chrome-plated finish. The diffuser may be made of a thermoplastic material having a series of transparent prismatic surfaces and/or a slight translucency to diffuse the light.

Figure 10:
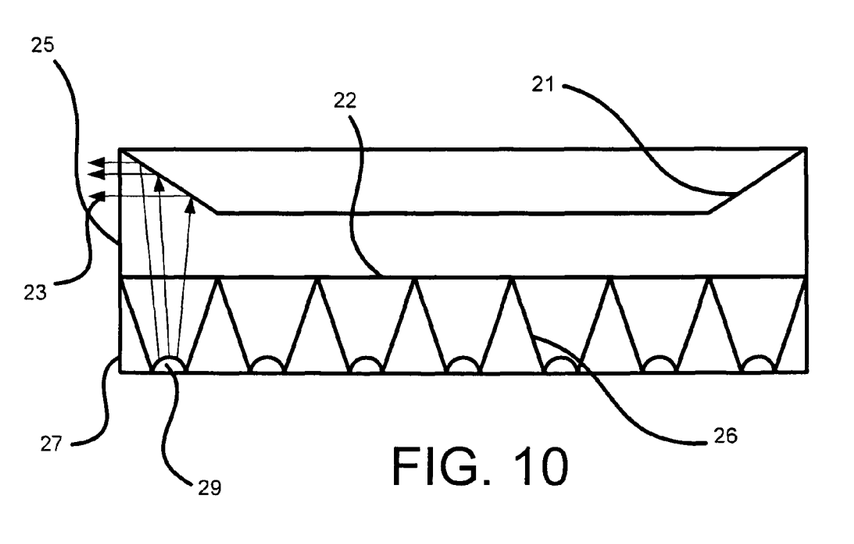
FIG. 10 is a cross sectional view of the assembled device according to an embodiment of the present invention showing the path of light emitted from the device.

In another exemplary embodiment of the present invention, FIGS. 6-10 show the device 20 comprising an LED structure 27 having a plurality of LEDs 29 disposed around the perimeter of the LED structure 27 surface. The structure may be powered by batteries placed inside the structure 27 or using other voltage sources which may be either AC or DC sources. Controls for alternating the sequence of the LEDs 29 turning on and off would also be housed inside the structure 27. Each LED is placed in its own housing having side walls 26. The inner surfaces of the side walls are covered with a reflective material that concentrates the light 23 emanating from the LED and directs it substantially upward as shown in FIG. 10.

Depending on the application, the reflectance efficiency of the LED housing side walls 26 may range from about 85% to about 99%, and more typically from 95% and 97%.

The light emanating from the LEDs are directed onto a reflective surface 21 enclosed in a housing 24. The reflective surface is angled inward and is positioned directly above the LEDs in a manner that most of the light from the LEDs 29 bounces off the reflective surface 21 and is redirected at about 90 degrees relative to the originating light. Depending on the application, the reflectance efficiency of the reflective surface 21 may range from about 85% to about 99%, and more typically from 95% and 97%.

The LEDs 29 are covered by a substantially transparent lens 22. The lens 22 protects the LEDs 29 and collimates the light emitted by the LED 29 onto the reflective surface 21 in a manner that the path of the light deviates only about +/−10 degrees from vertical in relation to the LED. The lens may be colored if it is desired to provide the effect of a flashing colored light. Typical colors are red, green and blue, but other colors also fall within the scope of the present invention.

A path for the beam of light 23 originating from an LED 29 is shown in FIG. 10. The light beam 23 is emitted from the LEDs 29 vertically and upward in relation to the LED structure disposed in a horizontal position. The reflected light comes off the reflective surface 21 substantially horizontally, and is then transmitted through the diffuser 25. The transparent lens 22 is designed to have only a minimal attenuating effect on the beam of light 23. Most typically, the reflective surface is angled inward at about 45 degrees; however, the angle may range from about 35 degrees to about 55 degrees depending on the application.

The transmission efficiency through the diffuser 25 may range from about 50% to about 70%, and more typically from about 55% to about 60%. Suitable materials for the construction of the reflective cone surface and the diffuser include but are not limited to metal, plastic and glass. In an exemplary embodiment of the present invention, the reflective cone is made of a thermoplastic material, polished to an A-2 mold finish with a chrome-plated finish. The diffuser may be made of a thermoplastic material having a series of transparent prismatic surfaces and/or a slight translucency to diffuse the light.

It should be understood, of course, that the foregoing relates to exemplary embodiments of the invention and that modifications may be made without departing from the spirit and scope of the invention.

The invention claimed is:

1. A device for controlling LED light beam direction and brightness comprising:
   an LED structure having a plurality of LEDs disposed on surface of said LED structure;
   said LED structure powered by batteries placed inside the structure or using other voltage sources which may be either AC or DC sources;
   controls for alternating sequence of said LEDs turning on and off housed inside said structure;
   a substantially transparent lens covering said LEDs;
   said lens protecting said LEDs and collimating said light emitted by said LED onto a reflective surface in a manner that path of said light deviates only about +/−10 degrees from vertical in relation to said LED;
   said reflective surface formed in shape of a cone that is encased in a housing;
   a light beam emitted from said LED structure vertically and upward in relation to said LED structure disposed in a horizontal position;
   said reflective surface redirects said light at an angle of about 90 degrees in relation to said light beam leaving said LED;
   said reflected light comes off said reflective surface substantially horizontally, and is then transmitted through a diffuser.

2. The device of claim 1 wherein said device is installed on vehicles for signaling warnings or emergencies such as a police car, a fire truck, a snow plow and an ambulance.

3. The device of claim 1 wherein said lens is colored to provide a flashing colored light.

4. The device of claim 3 wherein said colors are red, green and blue.

5. The device of claim 1 wherein said lens has a minimal attenuating effect on said beam of light.

6. The device of claim 1 wherein said reflective surface is angled at from about 35 degrees to about 55 degrees.

7. The device of claim 1 wherein brightness of said light beam exiting said device is controlled by varying properties of said reflective surface and said diffuser.

8. The device of claim 1 wherein reflectance efficiency of said reflective surface is in range from about 85% to about 99%.

9. The device of claim 1 wherein transmission efficiency through said diffuser is in range from about 50% to about 70%.

10. The device of claim 1 wherein said reflective surface and said diffuser comprise metal, plastic and glass.

11. The device of claim 1 wherein said diffuser comprises a thermoplastic material having a series of transparent prismatic surfaces and/or a slight translucency to diffuse said light.

12. The device of claim 1 wherein said LED structure has a plurality of LEDs disposed around perimeter of said LED structure surface.

13. A device for controlling LED light beam direction and brightness comprising:
   controls for alternating sequence of LEDs turning on and off housed inside a structure;
   each LED placed in its own housing having side walls;
   inner surfaces of said side walls covered with a reflective material that concentrates light emanating from said LED and directs it substantially upward;
   said LEDs are covered by a substantially transparent lens, said lens protects said LEDs and collimate said light emitted by said LED onto said reflective surface so that the path of said light deviates only about +/−10 degrees from vertical in relation to the LED.

14. The device of claim 13 wherein said lens is colored to provide a flashing colored light.

15. The device of claim 13 wherein said light beam is emitted from said LEDs vertically and upward in relation to said structure disposed in a horizontal position.

16. The device of claim 13 wherein said reflected light comes off said reflective surface substantially horizontally, and is then transmitted through a diffuser.

17. The device of claim 13 wherein said reflective surface is angled inward at a range from about 35 degrees to about 55 degrees and transmission efficiency through said diffuser is in a range from about 50% to about 70%.

* * * * *